2,706,725
Patented Apr. 19, 1955

2,706,725

POLYMERS OF VINYL BENZAL ACETOPHENONES

Cornelius C. Unruh and Charles F. H. Allen, Rochester, N. Y., assignors to Eastman Kodak Company, Rochester, N. Y., a corporation of New Jersey No Drawing. Application September 13, 1951, Serial No. 246,517

8 Claims. (Cl. 260—64)

This invention relates to the preparation of acylated vinyl polymers and more particularly to solvent-soluble and light-sensitive benzaldehyde derivatives of such polymers.

In the Allen et al. U. S. application Serial No. 771,142 filed August 28, 1947, now U. S. Patent 2,566,302 granted September 4, 1951, are described light-sensitive polymers made by the acylation of a polymer such as polystyrene with cinnamoyl chloride. Since acylation apparently proceeds to a limited extent before insolubilization occurs, a copolymer is obtained having the following general structure:

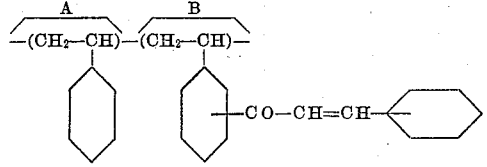

By this method polymers are obtained having good light sensitivity and solvent solubility only when the molecular proportions of units A to units B are from 5:1 to 18:1 (from about 16 to 5 mol percent of vinyl benzal acetophenone groups).

We have discovered that if polymers of this type are prepared by a different method they are not only more soluble in organic solvents but are more sensitive to light. Presumably, these improved characteristics are due to the fact that our process is capable of incorporating a comparatively larger number of benzal groups into a resin molecule and does not appear to cause any substantial number of cross linkages to be formed between the polymeric chains of atoms which appears to decrease solubility.

We prepare the polymers of our invention by condensing acetyl group-containing polymers such as polymers of acylated vinyl benzenes and naphthalenes, with benzaldehyde. In our applciation, Serial No. 246,516 filed concurrently are disclosed and claimed comparable condensation products of vinyl acetophenone and acetonaphthone polymers with nuclear-substituted aldehydes which condensation products are generally more light-sensitive than the vinyl benzal acetophenone polymers of this invention. Condensation with mixture of aldehydes e. g. benzaldehyde and a substituted aromatic aldehyde, and the synergistic effect obtainable are also disclosed therein.

We preferably prepare the polymers of the invention by condensing a polymer of a vinyl acetophenone or acetonaphthone (ar-vinyl acetophenone and ar-vinyl acetonaphthone polymers) with benzaldehyde. This is accomplished in several ways. A polymer containing aromatic nuclei such as polystyrene or polyvinyl naphthalene or a copolymer of styrene or vinyl naphthalene, is partially or completely acylated by the Friedel-Crafts reaction and the resultant vinyl acetophenone or acetonaphthone polymer is then condensed with preferably but not necessarily an excess of benzaldehyde to yield the vinyl benzal acetophenone or acetonaphthone polymer. Alternately, a vinyl acetophenone or acetonaphthone monomer can be homopolymerized or copolymerized with other compounds containing a polymerizable —CH=C< or CH=C< group such as styrene, and the resultant polymer condensed with benzaldehyde.

The following reactions illustrate methods for carrying out our invention:

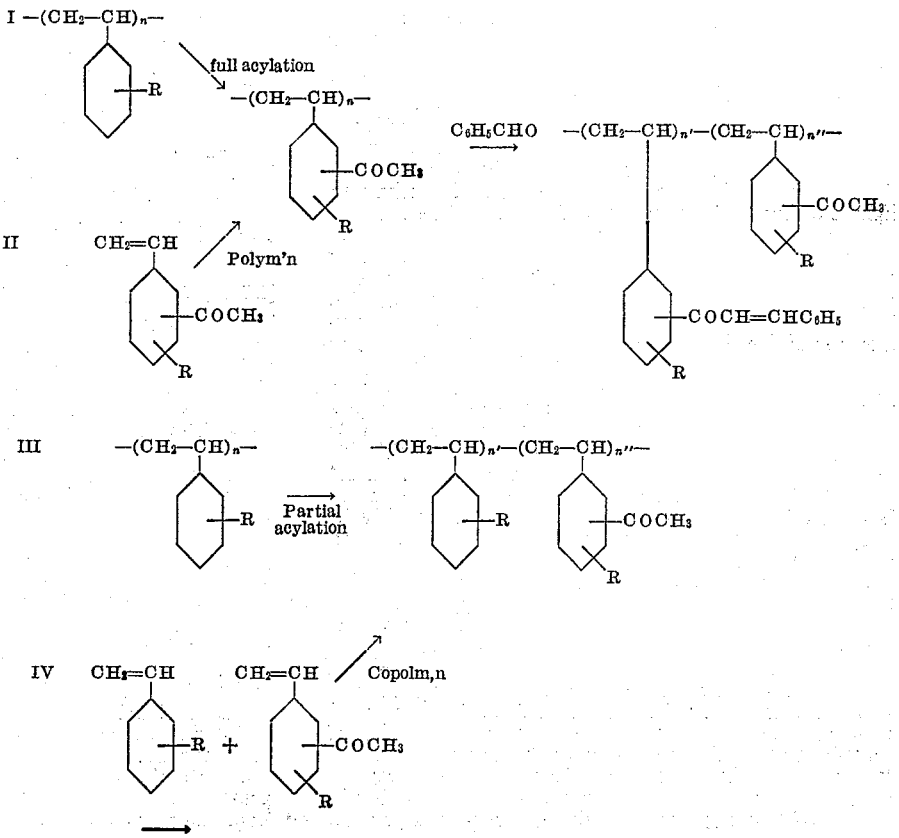

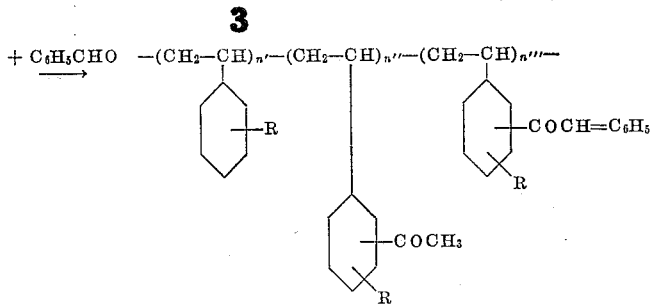

R represents a group such as hydrogen, alkoxy and aryloxy, e. g., o-methoxy, p-phenoxy, alkyl, e. g., m-tert. butyl and methyl, hydroxy, e. g., o-hydroxy, halogen, e. g., o-chloro, aralkyl, e. g., p-benzyl. The nucleus can also be substituted with more than one of such groups, e. g., 2,5- or 3,4-dichloro, 2,5-dimethyl, 3,4-dihydroxy, 2,3-dimethyl. Similarly such substituents may be present on a naphthalene nucleus when preparing the acylated vinyl naphthone polymers. When the polymer reacted with benzaldehyde is obtained by acylation of a vinyl benzene or naphthalene polymer (Methods I and III) the acid halide used may be any one or a mixture of those containing 2–5 carbon atoms such as acetyl, propionyl, butyryl and valeryl chlorides. Acetyl chloride is preferred since the vinyl benzal acetophenone and acetonaphthone polymers are more light sensitive than e. g., the vinyl benzal-propiophenone polymers. Methods II and IV are preferred when R is amino, hydroxy, sulfo and carboxyl in the acylated monomer.

Likewise, according to methods II and IV, the carbon chain of the ketone group of the monomeric compound preferably contains 2–5 carbon atoms. The Williams U. S. patent application Serial No. 246,524 filed concurrently herewith, provides a convenient method for preparing these ketones, for example, from p-ethyl acetophenone, particularly when the nuclear substituents are amino, sulfo, hydroxyl and carboxyl.

In the formulas in the above chart the values for the integers $n$, $n'$, $n''$ and $n'''$ are dependent somewhat upon the molecular weight of the polymer reacted with the aldehyde. $n''$ in Methods I and II and in Methods III and IV can be positive integers, or equal to zero in case all of the acetyl groups of the polymers have been reacted with the aldehyde as shown in the examples following. In the formulas it will be apparent that when a mixture of aldehydes including benzaldehyde is reacted with the acylated polymer, the resultant polymer contains a mixture of vinyl aralacetophenone units.

When the polymers of the invention are obtained as described regardless of the derivation of the particular vinyl acetophenone or acetonaphthone polymer which is condensed with benzaldehyde, the resultant products are in general more sensitive to light than those prepared by the methods of the Allen et al. invention. Sensitivity to light is determined by exposure of a layer of the polymer on a hydrophilic surface under a photographic step tablet to insolubilize the polymer in the exposed regions. After exposure, the least exposed areas are removed with a solvent for the polymer, such as methyl ethyl ketone. The sensitometric characteristics of the undissolved polymer remaining in the form of a step tablet are then recorded by well-known photographic methods. From these values a speed value is assigned to the particular polymer under test. When tested by this method, representative polymers of the Allen et al. invention (made by reacting from 1:5 to 1:18 mols of cinnamoyl chloride per mol of styrene polymer) possess speeds of from 1.4 to 7. None of the polymers of our invention have speeds less than 7 and speeds of 1000 to 1600 can readily be obtained by selection of the proper reactants and conditions of reaction.

As mentioned, a possible explanation for the fact that the polymers of our invention are more soluble and in general possess relatively higher light sensitivity, lies partly in a belief that substantially no cross-linkages are obtained in the polymers prepared by our methods. That is, it is believed that when a polymer containing aromatic nuclei is cinnamoylated by the methods of the Allen et al. invention, the catalyst utilized induces the formation of cross-linkages which reduce light sensitivity and which tend to insolubilize the polymer before very many cinnamoyl groups have been introduced into the molecule. On the contrary, by our methods we start from a polymer containing the desired proportion preferably, of vinyl acetophenone units. Subsequently, reaction of the polymer with benzaldehyde appears to yield a polymer substantially free of cross-linkages. Moreover, by our methods we can readily prepare the preferred polymers containing at least about 21 mol per cent of vinyl benzal acetophenone or acetonaphthone and having speeds of the order of 1600 to 8000.

Unruh et al., U. S. application Serial No. 246,514, filed concurrently describes methods for carrying out the acylation of styrene polymers with cinnamoyl chloride to obtain similar soluble polymers possessing speeds of about 100 to 150.

In general, the polymers of our invention contain combined units of the general structure

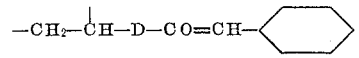

wherein D represents a single bond or an aryl group of the benzene or naphthalene series substituted if desired as indicated above, the polymers preferably containing at least 21.4 mol per cent of such units.

Polymers of the following are given as representative of those useful in our invention.

Benzal acetylstryrene
Benzal acetyl-o-methoxystyrene
Benzal acetyl-o-, m-, p-chlorostyrenes
Benzal acetyl-o-, m-, p-bromostyrenes
Benzal acetyl-p-benzylstyrene
Benzal acetyl-p-phenoxystyrene
Benzal acetyl-3,4-dichlorostyrene
Benzal acetyl-2,5-dimethylstyrene
Benzal acetyl-m-methylstyrene
Benzal acetyl-m-tert. butylstyrene
Benzal acetyl-3,4-dihydroxystyrene In general, these preferred polymers are obtained by condensing a styrene polymer (homopolymer or copolymer) of a compound having the general formula

wherein D is the same as mentioned and illustrated above, in the presence of acid or alkaline condensation catalyst, with benzaldehyde. Preferably but not necessarily, we use an excess of benzaldehyde based on the amount of vinyl acetophenone units present in the polymer molecule. As described above, specific methods include either partially or fully acetylating aromatic nuclei of a styrene polymer (homopolymer or copolymer) free of hydroxyl and amino groups reactive with acid halides, and then condensing acetyl groups thereof with benzaldehyde. Alternately, an acetylated styrene copolymer is obtained by copolymerization of a mixture of a vinyl acetophenone with a compound containing a polymerizable —CH=C< group or more particularly a CH$_2$=C< group, followed by condensing the copolymer with benzaldehyde.

Condensation of the vinyl acetophenone or acetonaphthone polymer with benzaldehyde is carried out in the presence of a dehydration catalyst such as mineral acid, for example, sulfuric or phosphoric acids, acetic anhydride, phosphorous pentoxide, toluene sulfonic acid, or basic condensation catalyst, particularly organic bases such as the quaternary ammonium bases, for example, trimethyl benzyl ammonium hydroxide, tetramethyl and tetraethyl ammonium hydroxides, tetraethanol ammonium hydroxide and trimethyl benzyl ammonium butoxide, sodium hydroxide and sodium methoxide.

As will be apparent from the following examples given for illustration of the methods of our invention, condensation with the aldehyde is preferably conducted in the presence of a diluent which preferably is a solvent for both the vinyl acetophenone polymer and the aldehyde such as a large excess of benzaldehyde; 1,4-dioxane, ketones such as benzophenone, etc. It is advisable to use a diluent, otherwise in some cases the products tend to become less soluble during the course of the condensation. From the above data and examples following, it will be apparent that the combination of benzaldehyde as both a reactant and diluent and alkaline catalyst produces resins of best light sensitivity.

It is possible to employ as diluent the original diluent used when making the vinyl acetophenone polymer or copolymer. That is, when vinyl acetophenone is homopolymerized or copolymerized with another polymerizable compound in a diluent, the polymer need not be isolated but the polymerization mixture can immediately be reacted with benzaldehyde without removal of the diluent. Any unpolymerized monomer which may remain in the polymerization mixture does no harm when the condensation is subsequently carried out in its presence.

As a source of the aldehyde used in the condensation reaction, pure benzaldehyde can be used or the aldehyde may be furnished by an acetal; that is, benzaldehyde acetal, or benzaldehyde diacetate. These compounds readily decompose in the presence of the condensation catalyst to yield benzaldehyde.

*Example 1.—The preparation of polyvinyl acetophenone*

In an all glass vessel equipped with efficient stirrer, dropping funnel and reflux condenser was placed 268 g. (2 mols.) of finely divided anhydrous aluminum chloride and 1 liter of carbon disulfide. To the constantly stirred suspension was added 118 g. (1½ mol.) of acetyl chloride followed by a solution of 104 g. (1 mol.) of polystyrene in 1 liter of carbon disulfide. Addition of the polymer solution took about 15 minutes. The reaction mixture became warm and refluxed gently, with copious evolution of hydrogen chloride. No artificial heating or cooling was used. After about ½ hour the evolution of hydrogen chloride had greatly diminished, but stirring was continued another hour. The reaction mixture was then filtered by suction, about 75% of the carbon disulfide used was thus recovered, and the residue on the filter consisted of highly swollen discrete particles. These were dried rapidly in a gentle current of air to give a dusty yellow powder, which was thoroughly agitated with cold 5% hydrochloric acid for about 15 minutes. The polymer was filtered off and washed by stirring in several changes of cold water. On drying at 40–50° C. there was obtained 142–144 g. of a fine, white powder of low ash content. The analysis of this product showed a carbon content of 81.9% and a hydrogen content of 6.9%. The calculated values for pure polyvinyl acetophenone are C=82.2%, H=6.85%.

The above polymer proven to consist essentially of polyvinyl-p-acetophenone, may be further purified by dissolving it in acetone and pouring the colorless, slightly hazy solution into an excess of agitated water. The white, fibrous precipitate is again washed with water and dried. Found C=82.3, H=7.0.

The other acylated nuclear substituted styrene and vinyl naphthalene polymers indicated above are prepared in this manner from the appropriate styrene or vinyl naphthalene polymer. Also, these polymers can be obtained by polymerizing o-, m- and p-vinyl acetophenones and acetonaphthones prepared by the method of the Williams invention above.

*Example 2.—Acid condensation of polyvinyl acetophenone with benzaldehyde*

To a solution of 10 g. of polyvinyl acetophenone in 190 g. of glacial acetic acid and 25 g. of benzaldehyde was added 10 g. of a 10% (by weight) solution of concentrated sulfuric acid in glacial acetic acid. The solution was kept in a brown bottle at room temperature (75° C.). After a specified period of time the solution was poured in a thin stream into an excess of agitated ethyl alcohol. The fibrous precipitate was then leached in 3 changes of fresh alcohol and dried. The product was further purified by resolution in methyl ethyl ketone and reprecipitated in alcohol. The table below gives the reaction times as well as the analyses and sensitometric values obtained.

The mol. per cent substitution was determined by infrared absorption measurements.

| Sample No. | Reaction time (hours) | Yield Obtained, g. | Mol. Percent Substitution | Speed |
|---|---|---|---|---|
| 1 | 8 | 10.2 | 7.0 | 32 |
| 2 | 16 | 10.5 | 13.9 | 180 |
| 3 | 24 | 11 | 21.4 | 700 |

The next series makes use of a better solvent than acetic acid for the reaction products. Benzaldehyde itself is both a reactant and solvent, an excess of which served both purposes.

*Example 3.—Acid condensation of polyvinyl acetophenone with benzaldehyde*

To a solution of 10 g. of polyvinyl acetophenone in 190 g. of benzaldehyde there was added while stirring efficiently 1.0 g. of concentrated sulfuric acid. The solution was allowed to stand at room temperature (75° F.) in a brown bottle for a specified period of time. At the end of this period the solution was poured in a thin stream into an excess of agitated methanol. The slightly yellow, fibrous precipitate was then pressed out, leached in fresh methanol, again pressed out and redissolved in methyl ethyl ketone. Again the polymer was isolated by pouring the solution into methanol. The fibrous precipitate was then pressed out and dried in the dark at room temperature. It is advisable to remove excess acid catalyst from the isolated polymer as rapidly as possible.

The following table indicates the reaction times used, the degree of substitution obtained and the sensitometric values. The degree of substitution was estimated from bromine absorption measurements.

| Sample No. | Reaction time (hours) | Yield Obtained, g. | Mol. Percent Substitution | Speed |
|---|---|---|---|---|
| 1 | 4 | 11.3 | 12.5 | 32 |
| 2 | 8 | 12.2 | 22.8 | 130 |
| 3 | 16 | 13 | 34.6 | 350 |
| 4 | 24 | | 62.6 | 650 |
| 5 | 48 | | 84.0 | 1,000 |
| 6 | 96 | | 100.0 | 1,600 |

The fact that a basic catalyst can also be used in the process is demonstrated in the next example.

*Example 4.—Alkaline condensation of polyvinyl acetophenone with benzaldehyde*

Ten grams of polyvinyl acetophenone were dissolved in 190 g. of benzaldehyde. Three ml. of a 40% solution of trimethyl benzyl ammonium hydroxide were stirred into the solution. A drop or two of the solution was mixed with water containing a little phenolphthalein. The reaction was not alkaline, so a further 2 ml. of the solution were added. This time the test showed strong alkalinity. Ten minutes after the addition of the basic solution a noticeable increase in viscosity of the solution was apparent. A slight excess of glacial acetic acid was now added to the solution to destroy the remaining basic catalyst. The clear solution was poured into an excess of stirred ethyl alcohol, the fibrous precipitate being leached in two fresh changes of ethyl alcohol. The polymer was reprecipitated from methyl ethyl ketone solution by pouring it into excess ethyl alcohol. The nearly white, fibrous precipitate was dried in the dark at room temperature.

Estimation of the degree of substitution by bromine absorption measurement indicated a value of 80.2%. Sensitometric measurements indicated that it had a speed of approximately 8000.

Similar results were obtained when acetylated polyvinyl naphthalene was condensed with benzaldehyde.

The effect of reducing the concentration of sulfuric acid is shown in the next example, the reaction rate is quite low, even though an elevated temperature was employed.

*Example 5.—Acid condensation of polyvinyli acetophenone with benzaldehyde*

Ten grams of polyvinyl acetophenone were dissolved in 190 g. of benzaldehyde. To this was added 1.0 g. of a 10% (by weight) solution of concentrated sulfuric acid in benzaldehyde. This solution was maintained at 50° C. (in a brown bottle) for six hours. Thereupon the solution was poured into excess of ethyl alcohol and then dried the precipitate in the dark. The precipitate was redissolved in methyl ethyl ketone and again precipitated by pouring the solution into an excess of ethyl alcohol.

The degree of substitution, as determined by bromine absorption measurements, was 4.6 mol. per cent, and the sensitometric evaluation gave a speed of 11.

*Example 6.—Preparation of a copolymer of vinyl acetophenone and isobutylene*

One hundred sixty grams of a copolymer of styrene and isobutylene (consisting of essentially equimolecular proportions of the two monomers) were dissolved in 1 liter of carbon disulfide. In a 5-l. flask fitted with an efficient glass stirrer, condenser and dropping funnel was suspended 268 g. of anhydrous aluminum chloride in 1 liter of carbon disulfide. To this was then added 118 g. of acetyl chloride. While this suspension was well stirred, the solution of the polymer was added over a period of ten minutes. Copious evolution of hydrogen chloride took place and a loose bulky precipitate formed. After the addition of the polymer was complete, stirring was continued for another hour. The product was filtered and the crumbly polymer dried in a current of air. The dried polymer was crushed up fine and stirred up with an excess of ice cold 5 per cent hydrochloric acid solution. The polymer was filtered off by suction and washed thoroughly with water to remove excess acid. Dried at 40° C. Yield about 180 grams.

*Example 7.—Condensation of a copolymer of vinyl acetophenone and isobutylene with benzaldehyde*

Ten grams of a copolymer of vinyl acetophenone and isobutylene made as above described were dissolved in a mixture of 160 cc. dioxane containing an excess of benzaldehyde. To this was then added with stirring, a solution of 1.0 gram of concentrated sulfuric acid in 10 cc. of dioxane. After 25 hours at room temperature, the resulting solution was poured into excess stirred methanol, the slightly soft, fibrous precipitate being leached in fresh methanol, then pressed out and redissolved in dioxane. This solution was again poured into agitated methanol. The precipitate was again dissolved in dioxane and this time precipitated into warm water. The rubbery polymer was leached in fresh water, then squeezed out and dried in the dark at room temperature. The resultant material was light-sensitive.

*Example 8.—The preparation of monomeric vinyl acetophenone*

Polyvinyl acetophenone (prepared by the reaction of acetyl chloride on polystyrene in the presence of anhydrous aluminum chloride) as described in Example 1 and in the Kenyon et al. United States patent application Serial No. 246,519 filed concurrently herewith, was heated in a distilling apparatus with the bare flame of a gas burner, the system being evacuated to less than 1 mm. pressure. 85% yield of a light brown oil was obtained which readily crystallized on chilling. This product was redistilled and a very pale yellow oil was collected which distilled at 93–98° C. at 0.5 mm. Hg pressure.

The distillate crystallized and this was recrystallized twice from ligroin (B. P. 60–90° C.) by chilling the solution thoroughly. White crystalline plates were obtained which melted at 34° C. Titration of a sample of this for double bond by means of bromine indicated a 98.9% content of vinyl acetophenone.

Vinyl acetophenone and the other acylated styrenes and vinyl napthtalenes can also be prepared directly by the method of the above Williams invention.

*Example 9.—The copolymerization of vinyl acetophenone with styrene*

Five grams of vinyl acetophenone prepared as in Example 8, were mixed with 3.6 g. of freshly distilled styrene together with 0.043 g. of benzoyl peroxide and 25 cc. of methyl ethyl ketone. This solution was refluxed gently on the steam bath for twenty-four hours. The resulting viscous, clear, colorless solution was poured into an excess of agitated methanol. The white, friable polymer was leached in fresh methanol, then dried at 40° C. Found C=84.1%, H=7.2%. Calculated C, 86.4%; H, 7.2%.

*Example 10.—Condensation of copolymer of styrene and vinyl acetophenone with benzaldehyde*

Four grams of the copolymer of vinyl acetophenone and styrene prepared as above were dissolved in 20 cc. of glacial acetic acid together with ten grams of benzaldehyde. Two grams of a 10 percent solution by weight of concentrated sulfuric acid in glacial acetic acid were then added. After 24 hours' standing at room temperature, the resulting solution was poured into an excess of stirred methanol. The precipitate was leached in fresh methanol and reprecipitated twice from methyl ethyl ketone solution into methanol. A white precipitate was obtained having a sensitometric speed of about 100.

*Example 11.—The preparation of a partially acetylated polystyrene*

Fifty-two grams of polystyrene were dissolved in 500 cc. of carbon disulfide. This was added to a suspension of 62. g. of anhydrous aluminum chloride in 500 cc. of carbon disulfide contained in a 3-liter glass flask fitted with an efficient glass stirrer, condenser and dropping funnel. While the mixture was being vigorously stirred, a mixture of 30 g. of acetyl chloride and 100 cc. of carbon disulfide were added dropwise. During this addition the reaction mixture soon became thick and geletinous and another 500 cc. of carbon disulfide were added. Stirring was continued and more of the acid chloride mixture was cautiously added and soon the gel structure collapsed and a suspension of highly swollen polymer particles suspended in the carbon disulfide was obtained. The remainder of the acid chloride could now be added at a faster rate. Copious evolution of hydrogen chloride was observed and stirring was continued for another hour after the addition of the acid chloride was complete. The mixture was then filtered and dried in a current of air. The crumbly product was broken up fine and added to a well-stirred ice cold 5% hydrochloric acid solution. The white suspension was filtered off and washed with water and dried. The white, dry polymer was dissolved in dioxane, the solution filtered and the filtrate was poured slowly into an excess of agitated methanol. The white, fibrous precipitate was washed thoroughly in water, then dried at 40° C.

*Example 12.—Condensation of polyvinyl acetophenone with benzaldehyde*

Two grams of polyvinyl acetophenone (made by the polymerization of monomeric 4-vinyl acetophenone obtained from 4-ethylacetophenone) were dissolved in 30 grams of benzaldehyde, and to this was added 2.0 g. of a 10% solution (by weight) of concentrated sulfuric acid in benzaldehyde. This solution was stored in a brown bottle at room temperature for 96 hours. At this time the solution was poured into an excess of stirred methanol, and the precipitate leached in fresh methanol. Twice the product was dissolved in methyl ethyl ketone and precipitated into methanol, and finally dried at room temperature. Then sensitometric speed of the product was very high.

*Example 13.—The condensation of a partially acetylated polystyrene with benzaldehyde*

Five grams of a copolymer of styrene and vinyl acetophenone (made by the incomplete acetylation of polystyrene as above) was dissolved in 90 g. of redistilled benzaldehyde. To this was added 10 g. of a 10% solution (by weight) of concentrated sulfuric acid in glacial acetic acid. After 16 hours' reaction at room temperature the product was poured into an excess of stirred methanol. The tan, fibrous precipitate was redissolved in methyl ethyl ketone. This solution was again poured into an excess of stirred methanol and the precipitate was filtered off and dried. This product showed a sensitometric speed of 500.

*Example 14.—Condensation of polyvinyl propiophenone with benzaldehyde*

Five grams of polyvinyl propiophenone (prepared as in Example 1 using propionyl chloride) were dissolved in a mixture of 90 cc. glacial acetic acid and 15 g.

benzaldehyde. To this solution was added 5 g. of 10% (by weight) solution of concentrated sulfuric acid in glacial acetic acid. After twenty-four hours at room temperature the solution was filtered and the filtrate was poured into an excess of stirred ethyl alcohol. The precipitate was leached in fresh alcohol and dried. Redissolved the product in methyl ethyl ketone and reprecipitated it by pouring the solution into alcohol. Dried in the dark at room temperature. Speed=2.5.

*Example 15.—Condensation of partially acetylated polystyrene with benzaldehyde*

Ten grams of partially acetylated polystyrene prepared as above were dissolved in 150 grams of dry dioxane and 25 grams of benzaldehyde. To this was added 10 grams of a 10 percent by weight solution of concentrated sulfuric acid in glacial acetic acid. The solution was stirred in a darkened container at room temperature (25° C.) for 7½ hours. At the end of this period the solution was poured in a thin stream into agitated methanol. The precipitate resulting was filtered off, leached in methanol and after redissolving in methyl ethyl ketone was poured into methanol and finally precipitated from methyl ethyl ketone solution into hot water. The polymer possessed a sensitometric speed of 650.

In addition to the vinyl acetophenone polymers given in the above examples can be used the mentioned acylated polymers e. g. of o-methoxy styrene, m-methyl styrene, o-, m-, p-chloro-, and α-methyl- styrenes, 2,3-dimethyl styrene, p-benzyl styrene, p-phenoxy-; 3,4-dichloro-; 2,5-dimethyl-; m-tert.-butyl-; 3,4-dihydroxy-styrenes, etc., copolymers of mixtures of these styrenes or these styrenes copolymerized with 5 to 95 mol percent of, for example, compounds containing polymerizable groups such as acrylonitrile, maleic anhydride, vinyl acetate, methyl methacrylate, and other acrylic and alkacrylic acids and esters, vinyl ketones, vinyl ethers, etc.

In general, the polymer reacted with the aldehyde need only contain a selected proportion, 100 mol percent or less, of the indicated —$CO(CH_2)_{n-1}CH_3$ groups where $n$ is 1 to 4. To this end the vinyl ketone polymers such as methyl vinyl ketone homo- or copolymers with other polymerizable compounds such as methyl methacrylate are also useful. In this case the arylidene acetyl group obtained is attached directly to carbon chain of the polymer rather than indirectly as is the case when the aldehyde is reacted with polymers such as polyvinylacetophenone.

Results similar to those of the above examples are obtained by condensing the benzaldehyde as above with homopolymers and copolymers of the o-, m- and p-acylated styrenes and vinyl naphthalenes prepared by the methods of the Williams invention. For example, substantially no difference in physical and chemical properties could be detected between the vinyl benzalacetophenone polymer of Example 4 and one obtained from p-vinylacetophenone (from p-ethylacetophenone) by condensation with benzaldehyde.

The polymers of the invention can be sensitized so as to further increase their sensitivity to light by use of the nitro compounds of Minsk et al. U. S. patent application Serial No. 148,684 filed March 9, 1950, now Patent No. 2,610,120 and the triphenylmethane, anthrone, quinone and ketone compounds of the Minsk et al. applications Serial Nos. 207,048–51 filed January 20, 1951, now Patents Nos. 2,690,966, and 2,670,285–7, particularly those acylated vinyl benzene and naphthalene polymers having inherently low light sensitivity before sensitization of the order of 100. Contrary to this, the light-sensitive polymers of the Allen et al. invention above are not sensitized by these compounds.

The polymers of the invention are particularly useful for photo-mechanical purposes where it is desired to prepare a resist image on a given surface. For example, the polymer is coated from solvent upon a support such as a metal plate, paper or organic colloid surface, for example, a surface repelling greasy printing ink when wetted with fountain solutions such as a lithographic paper plate, and after exposure to the desired line or halftone subject, the unexposed areas are dissolved away, leaving a resist image in polymeric material on the original support. At this stage, if the resist has been formed on a surface repelling greasy inks, the element can be used directly as a lithographic printing plate. In other cases, the support such as a metal plate, can be etched out in a well-known manner to obtain an etched metal printing plate. Other uses for our resins employing the light-sensitive properties of the polymers will occur to those skilled in the art. For example, the polymers can be employed to form continuous or discontinuous insoluble coatings on any surface or object to which they will adhere by exposure to light of a layer of the polymer on the object, thereby insolubilizing the coating on the object.

The light-sensitive polymers can be used for photographic reproduction of line, half-tone or continuous tone subjects. In the latter case it is preferable to coat the polymer on a transparent support, expose the coating thru the support followed by washing away the least exposed areas with solvent leaving a continuous tone relief image on the support which may be colored previously or subsequently with subtractively colored dyes or for purposes of color photography. Three such subtractively colored reliefs corresponding to blue, green and red aspects of a subject can then be superimposed to obtain a natural color reproduction or three such images may be formed on a single support by successively coating layers of the polymers on the support after first forming relief images thereon corresponding to one or more of the red, green, or blue aspects of the original subject. Thus after forming a yellow colored relief on the support, a layer of polymer is coated thereon and the magenta relief is formed on top of the yellow relief and the cyan similarly.

What we claim is:

1. A process for preparing a polymer which comprises condensing a polymer of a compound having the general formula:

$$CH_2=CH—D—CO—CH_3$$

wherein D represents a monocyclic arylene group of the benzene series, with benzaldehyde in the presence of a condensation catalyst.

2. A process for preparing a polymer which comprises condensing a polymer selected from the class consisting of poly-ar-vinyl acetophenone and polyvinylacetonaphthone polymers, with benzaldehyde in the presence of a condensation catalyst thereby obtaining a polymer containing benzal acetyl groups.

3. A process for preparing a polymer which comprises condensing a poly-ar-vinyl acetophenone polymer with benzaldehyde in the presence of a condensation catalyst thereby obtaining a polyvinyl benzalacetophenone polymer.

4. A process for preparing a polymer which comprises acetylating aromatic nuclei of a polymer selected from the class consisting of styrene and vinylnaphthalene polymers, and condensing acetyl groups of the resulting polymer with benzaldehyde in the presence of a condensation catalyst.

5. A process for preparing a polymer which comprises acetylating aromatic nuclei of a styrene polymer and condensing the resulting polyvinyl acetophenone polymer with benzaldehyde in the presence of a condensation catalyst.

6. A process for preparing a polymer which comprises polymerizing an ar-vinyl acetophenone and condensing acetyl groups of the resulting polymer with benzaldehyde in the presence of a condensation catalyst.

7. A process for preparing a benzal polyvinyl acetophenone polymer which comprises homopolymerizing ar-vinyl acetophenone and condensing acetyl groups of the resultant polymer with benzaldehyde in the presence of a condensation catalyst.

8. A process for preparing a polymer which comprises condensing a polymer of a compound having the general formula $$CH_2=CH—D—CO—CH_3$$

wherein D represents a monocyclic arylene group of the benzene series, with benzaldehyde in the presence of a condensation catalyst and excess benzaldehyde as a diluent.

References Cited in the file of this patent

UNITED STATES PATENTS 2,566,302    Allen et al. _____ Sept. 4, 1951